3,352,942
POLYAMIDES FROM 3-AMINO METHYL-3,5,5-TRI-
METHYL-CYCLOHEXYLAMINE AND AN AMINO
ACID
Karl Schmitt, Herne, and Fritz Gude, Wanne-Eickel,
Germany, assignors to Scholven-Chemie Aktienge-
sellschaft, Gelsenkirchen-Buer, Germany, a corpo-
ration of Germany
No Drawing. Filed Jan. 25, 1965, Ser. No. 428,577
Claims priority, application Germany, Jan. 29, 1964,
Sch 34,541
12 Claims. (Cl. 260—857)

This invention relates to the preparation of condensa-
tion polymers of cyclic diamines and dicarboxylic acids
i.e. polyamides. The invention more particularly relates to
the preparation of condensation polymers of improved
properties from cyclic diamines, dicarboxylic acids, and
amino acids. The invention is also concerned with the
novel condensation polymers thereby obtained.

According to the process which does not form a part
or represent the state of the art (U.S. patent application
Ser. No. 243,182 filed Dec. 3, 1962), it is possible to pre-
pare condensation polymers from 3-(aminomethyl)-3,5,5-
trimethyl cyclohexylamine (to be referred to hereinafter
as "cyclic diamine" for the sake of brevity) with dicar-
boxylic acids, preferably adipic acid. The condensation
products thereby produced exhibit certain improved prop-
erties, such as great surface hardness. However, they are
also possessed of a number of characteristics which inter-
fere with their use for conventional applications. One
such characteristic is their high softening range, which
makes it very difficult to work the condensation polymers
under the usual operating conditions.

The high softening range of the aforesaid condensa-
tion polymers can be considerably descreased by conduct-
ing under the same conditions of reaction a copolymeriza-
tion in which the cyclic diamine component is partially
replaced by a straight chained aliphatic diamine having
2 to 10 carbon atoms and, preferably, by hexamethylene
diamine. The condensation polymers which thereby re-
sult have substantially the same surface hardness and
transparency as the products initially described but a
more desirable softening range.

Among the objects of the present invention is the
provision for condensation of cyclic diamines and dicar-
boxylic acids having superior properties and, in particular,
softening ranges and ball hardness values to those herein-
after produced.

Another object is the provision of a method whereby
such improved condensation polymers can be simply and
reliably obtained.

These and other objects will become apparent from
the following description:

In accordance with the invention it has now been
found that the properties and characteristics of the con-
densation polymers of cyclic diamines and dicarboxylic
acids can be considerably improved by copolymerizing a
cyclic diamine, dicarboxylic acid, and an amino acid.
Preferably, as an amino acid, there is employed ε-amino-
capronic acid, 7-aminoheptanoic acid, 11-amino-undecanic
acid.

The dicarboxylic acid can be an aliphatic dicarboxylic
acid, saturated or unsaturated, and preferably one hav-
ing up to about 12 carbon atoms, such as adipic or
sebacic acid, their monomethylated or polymethylated de-
rivatives. It can also be an aromatic dicarboxylic acid as,
for example, a lower aryl (mono-nuclear) dicarboxylic
acid containing, for example, up to about 10 carbon atoms.
Mixtures of aliphatic dicarboxylic and aromatic dicar-
boxylic acids can also be used in accordance with the
invention. As illustrative of suitable aliphatic dicarboxylic
acids the following are mentioned: adipic acid in the
mono-, di-, or tri-, alkylated form, oxalic acid, malonic
acid, their di- or mono-substituted derivatives, succinic
acid, glutamic acid, pimelic acid, suberic acid, azelaic
acid, sebacic acid, maleic acid, fumaric acid, itaconic
acid, citraconic acid, mesaconic acid, etc. Illustrative of
the aromatic acids suitable for use herein are the follow-
ing: phthalic acid, isophthalic acid, and terephthalic acid
and their alkylated derivatives.

The 3-(aminomethyl)-3,5,5-trimethyl cyclohexylamine
has the formula

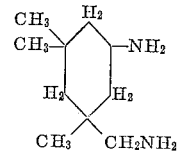

The products obtained from the copolymerization of a
ring diamine, dicarboxylic acid, and amino acid are char-
acterized by greater surface hardness than the condensa-
tion copolymers obtained by copolymerizing a cyclic di-
amine-adipic acid with hexamethylene diamine adipic
acid.

The copolymerization condensation with ε-aminocap-
ronic acid is most advantageously carried out with ε-
caprolactam, with the aid of the conventional condensa-
tion agents such as, for instance, alkali metals, alkali hy-
droxides, alkali alcoholates, alkali carbonates, alkali hy-
drides, alkali caprolactam, as well as with the alkali salts
of unstable carboxylic acids as, for example, sodium
phenylacetate and organo-metallic compounds with or
without the addition of co-catalysts, such as amides,
imides isocyanates, anhydrides, etc. (cf. Houben-Weyl,
"Methoden der Organischen Chemie" 4th ed., vol 14/2,
page 115; Stuttgart 1963.)

The condensation-polymerization reaction can be con-
ducted with or without a solvent. If a solvent is used,
there may be employed any of the conventional aromatic
hydrocarbon solvents, e.g. benzene or its alkylated de-
rivatives, or aliphatic hydrocarbon solvents, e.g. of about
6 to 12 carbon-atoms, and alicyclic hydrocarbons, e.g. cy-
clohexane and its derivatives, also halogenated hydrocar-
bons with boiling points to about 160° C., e.g. chloro-
form, carbon-tetrachloride, trichlorethylene, bromo-ben-
zene etc. and also low alcohols as well as water. The
reaction can be conducted in the presence of the con-
ventional stabilizers or chain interrupters, such as, for
instance, mono-functional carboxylic acids or amines.
Where the reaction is carried out in a water-free me-
dium, it is possible to add, as catalysts, such substances
as amines, carboxylic acids, ammonium salts, for instance,
ammonium chloride or hydrochloric acid salts of car-
bonamides, as, for example, of urea, caprolactam or benz-
amide, with the addition of a dicarboxylic acid cyclic
diamine. It is also possible to copolymerize prepared poly-
caprolactam, commercially known as "Nylon 6" with a
dicarboxylic acid cyclic diamine and a dicarboxylic acid
by heating this mixture at fusion for a number of hours,
and completing the reaction in a vacuum of up to about
$10^{-2}$ torr. The copolymerization can also be carired out
starting with the free ε-aminocaproic acid.

In the copolymerization with 11-amino-undeconoic acid,
it is possible to proceed by reacting prepared polyamide-
11 with a mixture of dicarboxylic acid and cyclic diamine.
The copolymerization can also be carried out in the solid
phase (below about 200° C.) as well as in a solvent me-
dium such as, for instance, in an aromatic or aliphatic
hydrocarbon, at a temperature below the fusion point of
the copolyamides, the latter separating in powder form.

It is possible to add ε-aminocaproic acid and/or 11-
aminoundecanoic acid in polymeric or monomolecular form (as well as caprolactam in place of ε-aminocaproic acid) to dicarboxylic acid cyclic diamines in quantities of up to about 60%, without losing the glassy character of the condensation polymer. Even if these quantities are exceeded, amounting to for example up to 80%, clearly apparent effects are still obtained. As the lower limit, the amount added is generally not to be less than 2%. Instead of pure dicarboxylic acid diamines, it is, of course, also possible to use dicarboxylic acid and cyclic diamine without the prior isolation of the salt that forms from the two components. It is also possible to use esters or semiesters or even acid halides or acid amides in place of the free dicarboxylic acids.

The condensation polymerization is carried out under the conventional conditions substantially as follows:

Caprolactam, for example, is slowly heated with a condensation agent for instance, caustic soda, to temperatures of 170 to 300° C. and preferably 240 to 280° C. After it appears that an increase in viscosity has occurred in the melt, the dicarboxylic acid 3-(aminomethyl)-3,5,5-trimethylcyclohexylamine is added and the condensation continued, being completed in a vacuum, the water which is formed in the reaction being removed. The dicarboxylic acid and cyclic diamine can be added successively. Amines or acids can be used in the conventional manner to form the terminal groups. The precondensation can also be supported under a pressure to about 30 atm. and solvents can be added. The molecular proportion of cyclic diamine:dicarboxylic acid:amino acid can range between 49:49:2 and 1:1:98.

The special characteristics of the products obtained from the condensation polymerization in accordance with the invention are apparently to be attributed to the fact, that, due to their molecular construction and their angularity, the diamines produce products which cannot crystallize or only in small dimension and, therefore, are entirely vitreous and opaque. There results an immensely greater surface hardness and generally crystal-clear transparency in the products. These features, coupled with the fact that the condensation products are readily soluble in a large number of solvents and particularly in the known coating composition solvents, open the way to entirely new applications for which such products have previously been unsuitable such as, for example, their use in paints, varnishes, surface-protection agents, and the like.

The invention is further illustrated by the following examples without being restricted thereto. In the examples, the reduced specific viscosity ($\eta$-red) is given as an indication of the molecular weight and is determined on the basis of a 1% solution in pure formic acid at 20° C. The ball hardness is determined according to DIN 57,302 (German Industrial Standards) using in that connection a ball diameter of 5 mm. and a test load of 50 kg. The first value to be observed ("0 second") is given as ball pressure hardness in the examples. The softening range is determined by placing a sample of condensation product having a size of about that of a pin-head between two cover glasses of a heating table microscope having a 100-fold enlargement. The sample is heated up to about 20° C. under the assumed softening start and thereafter, while under continuous observation from the microscope ocular, the heating table is subjected to temperature increase of about 1–2° C./min. The lower value of the softening range is taken as the first visible recognition of melt formation, and the upper value is established as the point at which complete liquefaction of the test sample occurs.

*Example 1*

50 g. caprolactam were heated at 270° C. under nitrogen in a round-bottomed flask and treated with 0.2% solid caustic soda. The viscosity of the melt thereafter increased rapidly. After about 5 minutes a salt of adipic acid and 3-(aminomethyl)-3,5,5-trimethylcyclohexamine (designated "A–R salt") was added. A transparent fused mass was thereby formed. This mixture was heated for 4 hours under nitrogen at 230–240° C. with agitation, and thereafter the water of reaction was removed over a period of 7 hours at 250–260° C. and 12 mm. Hg.

In the following table certain of the physical properties of the condensation products which were formed are set out:

| A–R Salt (wt. percent) | Caprolactam (wt. percent) | Softening Range (° C.) | Ball Hardness Test (kg./cm.²) | $\eta$-red |
|---|---|---|---|---|
| 80 | 20 | 118–198 | 1,818 | 0.93 |
| 20 | 80 | 153–192 | 1,675 | 2.22 |
| 50 | 50 | 183–192 | 1,592 | 1.02 |

*Example 2*

50 g. polycaprolactam ($\eta$-red value 1.25, melting range 222–224° C.) were heated with A–R salt with agitation and under nitrogen in a round-bottomed flask for 5 hours at 230–240° C. The water of reaction was separated off at 12 mm. Hg and 250–260° C. bath temperature over a period of 8 hours. The condensation products obtained had the following characteristics:

| A–R Salt (wt. percent) | Caprolactam (wt. percent) | Softening Range (° C.) | Ball Hardness Test (kg./cm.²) | $\eta$-red |
|---|---|---|---|---|
| 80 | 20 | 157–181 | 1,720 | 0.78 |
| 20 | 80 | 204–213 | 1,516 | 2.38 |
| 50 | 50 | 148–172 | 1,720 | 1.47 |

*Example 3*

(a) 20 g. ε-caprolactam and 0.2 g. powdered caustic soda were heated under nitrogen to about 220° C., and after a few minutes there were added 10 g. of a salt of terephthalic acid and cyclic-diamine (melting point: 226° C.). Following 9 hours of reaction time the temperature was increased to 240° C. and a vacuum of 14 mm. Hg was applied for a further 9 hour period. The polycondensate which was thereby formed had a softening range of 63–172° C., a ball hardness of 1608 and an $\eta$-red of 0.56.

(b) 28.5 g. ε-caprolactam, 0.02 g. powdered caustic soda and 1.5 g. terephthalic acid cyclic-diamine were condensed under the same reaction conditions as described in (a) above. A polycondensate was thereby produced having a softening range of 185–215° C., a ball hardness of 1248, and an $\eta$-red value of 0.84.

*Example 4*

A mixture of the salts comprising 10 g. 2-methyl adipic acid cyclic-diamine (melting point 195° C.) and 10 g. sebacic acid cyclic-diamine (melting point 152° C.) were pre-condensed under nitrogen with 10 g. ε-caprolactam under addition of 30 cm.³ water. The condensation was carried out for 9 hours at 200° C. and was followed by further heating for 9 hours at 220° C. and a vacuum of 20 mm. Hg. The condensation product thereby obtained had a softening range of 87–167° C., a ball hardness of 1447, and an $\eta$-red value of 0.86.

*Example 5*

10 g. 11-amino-undecane acid, 20 g. A–R salt, and 10 cm.³ water were refluxed for 10 hours under nitrogen at 200° C. and thereafter the condensation was continued for a further 8-hour period at 200° C. under a vacuum of 16 mm. Hg. The synthetic product which was produced had a melting range of 121–185° C., a ball hardness of 1253, and an $\eta$-red value of 1.27.

*Example 6*

A mixture of 10 g. poly-11-amino-undecane acid, 10 g. A–R salt, 5.3 g. terephthalic acid dimethyl ester, and 4.7 g. cyclic-diamine were heated under addition of 10 cm.³ water for 9 hours under nitrogen and refluxed at a temperature of 200° C. The poly-condensation was continued under a vacuum of 20 mm. Hg and a temperature of 220° C. for another 8 hours. The condensation product was obtained having a ball hardness of 1632, a melting range of 103–214° C., and an η-red value of 0.87.

We claim:

1. A polyamide of a mixture consisting essentially of 3-(amino-methyl)-3,5,5-trimethyl cyclohexylamine, a dicarboxylic acid and an amino acid.

2. A polyamide of a mixture consisting essentially of 3-(amino-methyl)-3,5,5-trimethyl cyclohexylamine, a dicarboxylic acid having up to about 12 carbon atoms and an amino acid.

3. A polyamide of a mixture consisting essentially of 3-(amino-methyl)-3,5,5-trimethyl cyclohexylamine, a dicarboxylic acid selected from the group consisting of aliphatic dicarboxylic acids having up to about 12 carbon atoms and aryl dicarboxylic acids having up to about 10 carbon atoms and an amino acid.

4. A polyamide according to claim 3 wherein said dicarboxylic acid is at least one member selected from the group consisting of adipic, succinic, malonic, maleic, sebacic, phthalic, isophthalic and terephthalic acids.

5. A polyamide according to claim 3 wherein said amino acid is a member selected from the group consisting of ε-amino capronic acid and 11-amino-undecanic acid.

6. A polyamide of a mixture consisting essentially of caprolactam, adipic acid and 3-(aminomethyl)-3,5,5-trimethyl cyclohexylamine.

7. A polyamide of a mixture consisting essentially of polycaprolactam, adipic acid, and 3-(aminomethyl)-3,5,5-trimethyl cyclohexylamine.

8. A polyamide of a mixture consisting essentially of ε-caprolactam, terephthalic acid and 3-(aminomethyl)-3,5,5-trimethylcyclohexylamine.

9. A polyamide of a mixture consisting essentially of ε-caprolactam, 2-methyl adipic acid, sebacic acid and 3-(amino-methyl)-3,5,5-trimethylcyclohexylamine.

10. A polyamide of a mixture consisting essentially of 11-amino-undecane acid, adipic acid and 3-(aminomethyl)-3,5,5-trimethylcyclohexylamine.

11. A polyamide of a mixture consisting essentially of 11-amino-undecane acid, terephthalic acid dimethyl ester and 3-(amino-methyl)-3,5,5-trimethylcyclohexylamine.

12. A coating composition consisting essentially of as film-forming ingredient, a polyamide according to claim 1 and a coating composition solvent, the resin being dissolved in the solvent.

References Cited

UNITED STATES PATENTS

| | | | |
|---|---|---|---|
| 2,130,948 | 7/1938 | Carothers | 260—78 |
| 2,252,555 | 8/1941 | Carothers | 260—78 |
| 2,274,831 | 3/1942 | Hill | 260—78 |

WILLIAM H. SHORT, *Primary Examiner.*

SAMUEL H. BLECH, *Examiner.*

H. D. ANDERSON, *Assistant Examiner.*